US008851432B2

(12) United States Patent
Chiasson et al.

(10) Patent No.: US 8,851,432 B2
(45) Date of Patent: Oct. 7, 2014

(54) MULTI-POSITION BASE ASSEMBLY FOR TOOL

(75) Inventors: Mark A. Chiasson, Merrimack, NH (US); Henry Maxwell, Pembroke, NH (US); Thomas R. Faucher, Manchester, NH (US); John Lefavour, Litchfield, NH (US); Richard Robicheau, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 151 days.

(21) Appl. No.: 13/617,419

(22) Filed: Sep. 14, 2012

(65) Prior Publication Data

US 2013/0008011 A1 Jan. 10, 2013

Related U.S. Application Data

(62) Division of application No. 12/986,332, filed on Jan. 7, 2011.

(60) Provisional application No. 61/324,405, filed on Apr. 15, 2010.

(51) Int. Cl.

| | |
|---|---|
| ***A47F 5/02*** | (2006.01) |
| ***F16M 13/00*** | (2006.01) |
| ***B25B 17/00*** | (2006.01) |
| ***B25B 27/10*** | (2006.01) |
| ***B25H 1/00*** | (2006.01) |

(52) U.S. Cl.

CPC .............. *B25B 27/10* (2013.01); *B25H 1/0042* (2013.01)

USPC ..... 248/130; 248/397; 248/185.1; 248/284.1; 248/291.1; 248/596; 248/346.06; 248/349.1; 248/519; 248/521; 81/57.24; 81/57.35; 81/57.4; 81/462; 16/239; 16/292; 16/297; 16/217; 16/219; 16/360

(58) Field of Classification Search

USPC .............. 248/346.03, 130, 397, 183.1–183.2, 248/185.1, 284.1, 291.1, 292.12, 596, 248/346.06, 349.1, 664, 371, 514, 519, 521, 248/393, 207, 588, 282.1; 108/6; 81/57.24, 81/57.35, 57.4, 462; 16/239, 292, 297, 16/217, 219, 360

See application file for complete search history.

(56) References Cited

U.S. PATENT DOCUMENTS

| | | | | | |
|---|---|---|---|---|---|
| 361,851 | A | | 4/1887 | Whitcomb | |
| 693,811 | A | * | 2/1902 | Yonge | 269/69 |
| 2,667,317 | A | * | 1/1954 | Trebules | 248/514 |
| 2,790,617 | A | * | 4/1957 | Harland | 248/278.1 |
| 2,896,901 | A | * | 7/1959 | Levy et al. | 248/278.1 |
| 3,304,037 | A | * | 2/1967 | Candela | 248/515 |

(Continued)

*Primary Examiner* — Terrell McKinnon
*Assistant Examiner* — Christopher Garft
(74) *Attorney, Agent, or Firm* — Mark S. Bicks; Alfred N. Goodman

(57) ABSTRACT

A base assembly removably and adjustably receives a tool and includes a base and a wall extending outwardly from the base. First and second openings are disposed in the wall. First and second cutouts are disposed in the wall to receive the tool. A pivot pin is removably received by the first and second openings. The tool is removably disposed on the pivot pin. A locking ring is disposed on the pivot pin. The locking ring is in a locked position to prevent movement of the pivot pin and in an unlocked position to allow movement of the pivot pin, thereby allowing the tool to be easily moved between positions and securely locked in a desired position.

13 Claims, 12 Drawing Sheets

(56) References Cited

U.S. PATENT DOCUMENTS

| | | | | | |
|---|---|---|---|---|---|
| 3,659,329 | A | * | 5/1972 | Walker | 29/734 |
| 3,675,916 | A | | 7/1972 | Kartasuk | |
| 3,793,685 | A | * | 2/1974 | Knecht | 24/651 |
| 3,848,865 | A | * | 11/1974 | Bird | 269/69 |
| 3,970,274 | A | * | 7/1976 | Resk | 248/185.1 |
| 4,034,946 | A | * | 7/1977 | Zimmer, Jr. | 248/183.2 |
| 4,466,664 | A | * | 8/1984 | Kondou | 297/411.39 |
| 4,789,146 | A | | 12/1988 | Kuei | |
| 4,942,757 | A | | 7/1990 | Pecora | |
| 5,060,378 | A | | 10/1991 | LaBounty | |
| 5,335,142 | A | * | 8/1994 | Anderson | 361/679.07 |
| 5,593,119 | A | * | 1/1997 | Moore et al. | 248/185.1 |
| 5,641,147 | A | * | 6/1997 | Pena | 473/552 |
| 6,125,523 | A | | 10/2000 | Brown | |
| 6,206,387 | B1 | * | 3/2001 | Tsai | 280/87.041 |
| 6,357,704 | B1 | * | 3/2002 | Katoh et al. | 248/133 |
| 6,547,308 | B2 | * | 4/2003 | Hamelink et al. | 296/97.9 |
| 6,619,606 | B2 | * | 9/2003 | Oddsen et al. | 248/282.1 |
| 6,634,611 | B1 | * | 10/2003 | Shih | 248/339 |
| 6,761,469 | B2 | * | 7/2004 | Wu | 362/655 |
| 6,796,541 | B2 | * | 9/2004 | Lu | 248/291.1 |
| 7,340,936 | B2 | | 3/2008 | Gregg | |
| 7,464,578 | B2 | | 12/2008 | Ayer | |
| 7,673,844 | B2 | * | 3/2010 | Zhang et al. | 248/372.1 |
| 2008/0259543 | A1 | * | 10/2008 | Zhang et al. | 361/681 |
| 2011/0209411 | A1 | * | 9/2011 | Thompson et al. | 49/506 |

* cited by examiner

MULTI-POSITION BASE ASSEMBLY FOR TOOL

CROSS-REFERENCE TO RELATED APPLICATION

This application is a divisional and claims the benefit under 35 U.S.C. §120 of patent application Ser. No. 12/986,332, filed Jan. 7, 2011, which claims the benefit under 35 U.S.C. §119(e) of provisional application Ser. No. 61/324,405, filed Apr. 15, 2010, the entire disclosures of both applications are hereby incorporated by reference.

FIELD OF THE INVENTION

The present invention relates generally to a base assembly for receiving a tool in a plurality of positions. More particularly, the present invention relates to a first locking ring that receives a pivot pin connected to a tool for holding the tool in a plurality of positions. Still more particularly, the present invention relates to a base assembly having a second locking ring that receives the pivot pin to further facilitate securing the tool to the base assembly.

BACKGROUND OF THE INVENTION

Many tools are large, unwieldy and difficult to manipulate and operate. Depending on the particular application for which the tool is being used, maneuvering the tool into the appropriate position to accomplish a task and maintaining the tool in that position during use is difficult. Accordingly, a need exists for a base assembly that accommodates a tool in a plurality of positions and facilitates moving the tool between positions.

SUMMARY OF THE INVENTION

In accordance with an aspect of the present invention, a need exists for a base assembly adapted to receive a tool in a plurality of positions.

In accordance with another aspect of the present invention, the base assembly includes a first locking ring that receives a pivot pin connectable to the tool in a plurality of positions.

In accordance with another aspect of the present invention, the base assembly includes a second locking ring that receives the pivot pin to further secure the tool to the base assembly.

In accordance with another aspect of the present invention, the base assembly includes a clip to secure the pivot pin to the base assembly when the tool is not received by the assembly.

In accordance with another aspect of the present invention, a dowel pin is received by the pivot pin and the tool to secure the tool to the pivot pin, thereby allowing the tool to rotate with the pivot pin.

In accordance with yet another aspect of the present invention, a handle is connected to the pivot pin to facilitate manipulation of the pivot pin.

The foregoing objectives are basically attained by a base assembly that removably and adjustably receives a tool. The base assembly includes a base and a wall extending outwardly from the base. First and second openings are disposed in the wall. First and second cutouts are disposed in the wall to receive the tool. A pivot pin is removably received by the first and second openings and is removably disposable in the tool. A locking ring is disposed on the pivot pin. The locking ring is in a locked position to prevent movement of the pivot pin and in an unlocked position to allow movement of the pivot pin, thereby allowing the tool to be easily moved between positions and securely locked in a desired position.

The foregoing objectives are also basically attained by a base assembly that removably and adjustably receives a tool. The base assembly includes a base and a wall extending outwardly from the base. First and second openings are disposed in the wall. First and second cutouts are disposed in the wall to receive the tool. A pivot pin is removably received by the first and second openings and is removably disposable in the tool. A first locking ring is disposed on the pivot pin. The locking ring is in a locked position to prevent movement of the pivot pin and in an unlocked position to allow movement of the pivot pin. A second locking ring is disposed on the pivot pin. The first and second locking rings are disposed on opposite sides of the wall.

The foregoing objectives are also basically attained by a method of adjustably positioning a tool on a base assembly. A first through hole in the tool is aligned with first and second openings in a wall extending upwardly from a base of the base assembly. A pivot pin is passed through the first opening, the first through hole and the second opening. The pivot pin is rotated to position the tool. A locking pin is passed through a second through hole in the pivot pin to prevent further rotation of the pivot pin.

Objects, advantages, and salient features of the invention will become apparent from the following detailed description, which, taken in conjunction with the annexed drawings, discloses exemplary embodiments of the invention.

As used in this application, the terms "front", "rear", "upper", "lower", "upwardly", "downwardly" and other relative orientational descriptors are intended to facilitate the description of the base assembly, and are not intended to limit the structure of the base assembly to any particular position of orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 6 is a partial side elevational view in partial cross section of a locking ring receiving a dowel pin and pivot pin in;

Throughout the drawings, like reference numbers will be understood to refer to like parts, components and structures.

DETAILED DESCRIPTION OF THE EXEMPLARY EMBODIMENTS

In exemplary embodiments of the present invention shown in FIGS. 1-24, a base assembly 21 is adapted to receive a tool 11 in a plurality of positions. Any suitable tool, such as a 60 ton c-head crimping tool, may be used with the base assembly 21. The tool 11 is connected to the base assembly 21 in one of a plurality of positions, thereby allowing the tool to be quickly and easily mounted in the desired position for the work being performed.

Figure 1:
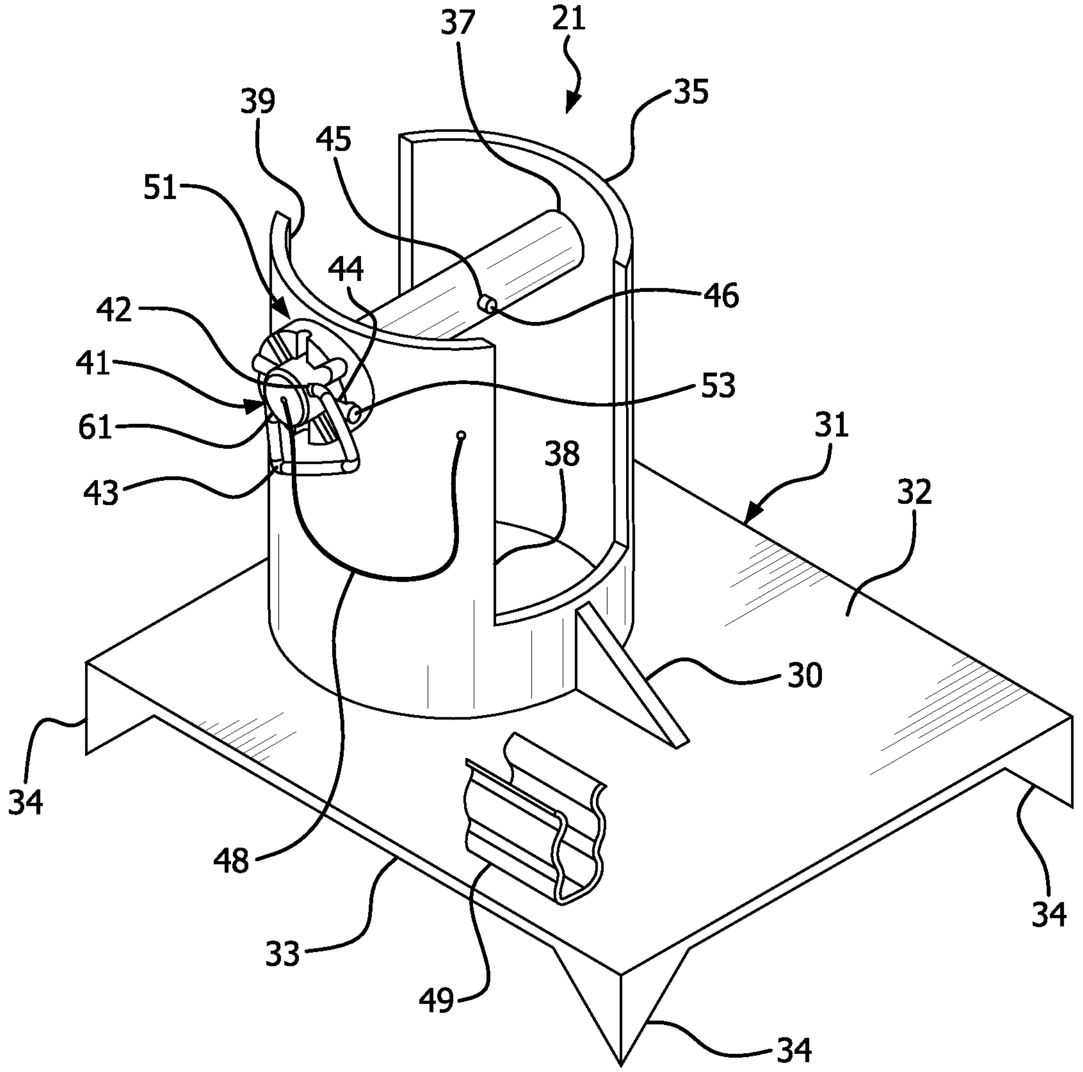
FIG. 1 is a perspective view of the multi-position base assembly without a tool according to an exemplary embodiment of the present invention.
Figure 2:
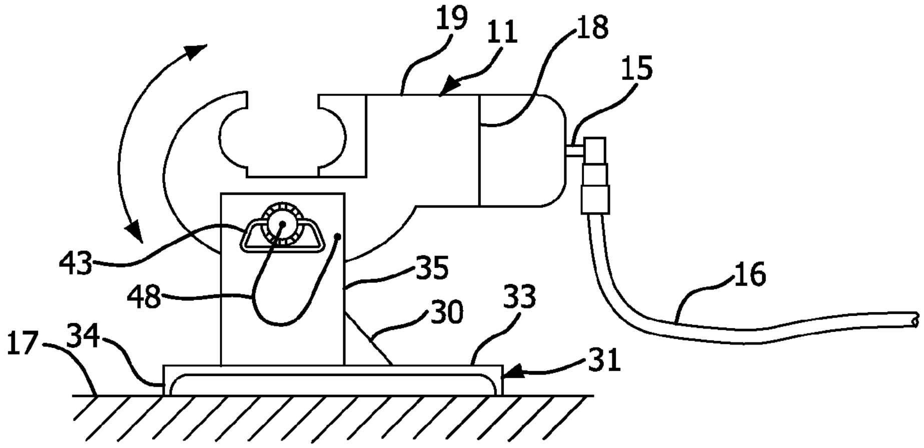
FIG. 2 is a side elevational view of the base assembly of FIG. 1 with a tool received in a horizontal position.
Figure 5:
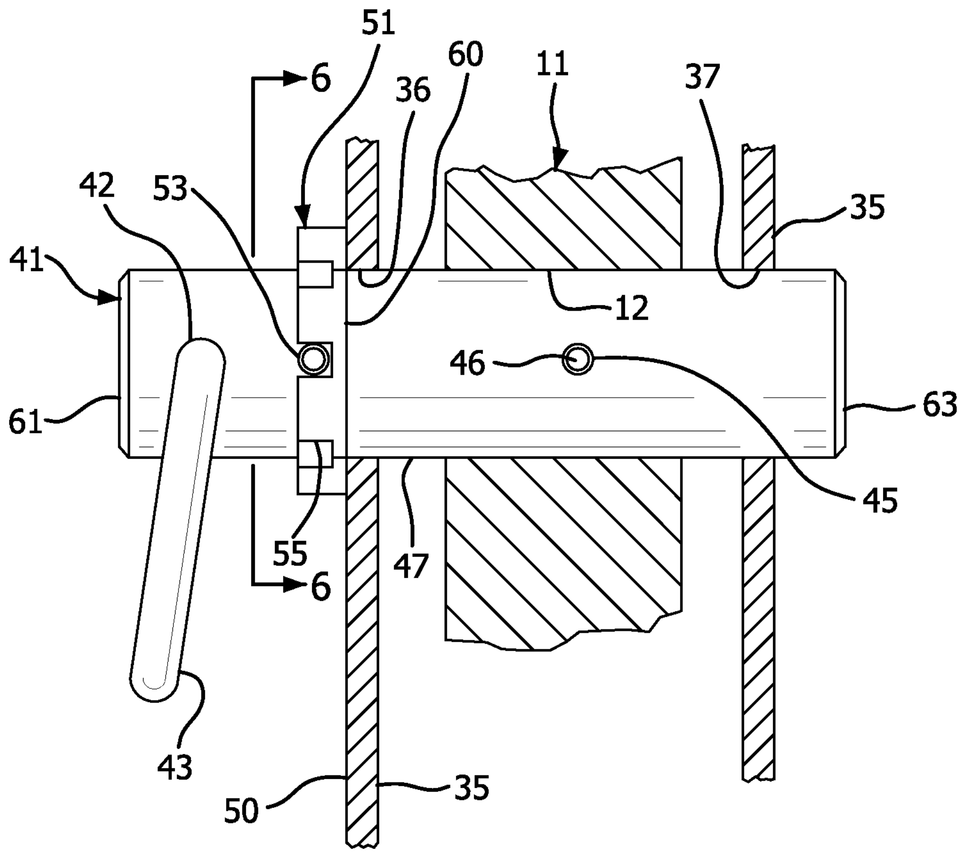
FIG. 5 is a partial top plan view in partial cross section of the base assembly of FIG. 1 receiving a tool.

The base assembly 21 includes a base 31, a pivot pin 41 and a first locking ring 51, as shown in FIG. 1. The base 31 has a substantially planar platform 33 with a plurality of legs 34 extending downwardly therefrom. Preferably, the platform is substantially rectangular with the legs 34 positioned in each of the corners. A right circular cyindrical wall 35 extends substantially upwardly from an upper surface 32 of the platform 33. A first opening 36 and a second opening 37 are formed in the wall 35 to receive the pivot pin 41, as shown in FIG. 5. First and second cutouts 38 and 39 are formed in the wall 35 to receive the tool 11, as shown in FIGS. 2 and 5. Preferably, the platform 33, the wall 33 and the legs 34 are made of aluminum. A rib 30 may be disposed between the wall 33 and the upper surface of the platform 32 to strengthen the wall. Preferably, the rib 30 is substantially perpendicular to a longitudinal axis of the pivot pin 41. As shown in FIG. 1, preferably a first axis through the first and second openings 36 and 37 is substantially perpendicular to a second axis through the first and second cutouts 38 and 39.

The pivot pin 41 has first and second ends 61 and 63 and is received by the first and second openings 36 and 37 in the wall 35, as shown in FIGS. 1 and 5. The first end 61 of the pivot pin 41 is disposed outside of the wall 35 proximal the first wall opening 36 and the second end 63 of the pivot pin is disposed outside of the wall 35 proximal the second opening 37. A first through hole 42 in the pivot pin 41 receives a handle 43. A second through hole 44 in the pivot pin 41 receives a locking pin 53 connected to the first locking ring 51. Preferably, the second through hole 44 is disposed closer to the wall 35 than the first through hole 42. A third through hole 45 in the pivot pin 41 receives a dowel pin 46. Preferably, the third through hole 45 is disposed on a portion of the pivot pin 41 disposed between the first and second openings 36 and 37 in the wall 35. A clip 49 may be disposed on the upper surface 32 of the platform 33 to secure the pivot pin 41 to the base assembly 21 when the pivot pin is not in use, such as during transportation of the base assembly. A tether 48 may be used instead of or in addition to the clip 49 to secure the pivot pin 41 to the base assembly 21. As shown in FIG. 1, the tether 48 may be connected to an end of the pivot pin 41 and to the wall 35.

Figure 6:
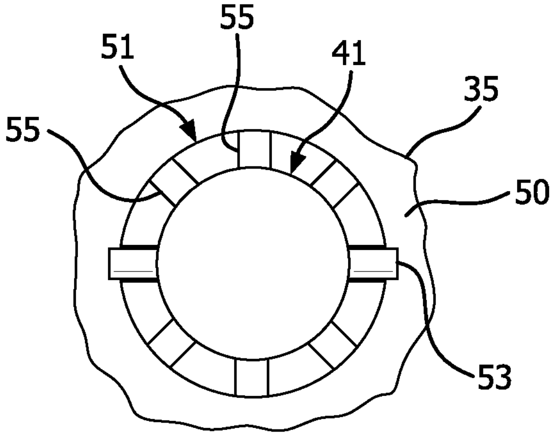
Figure 8:
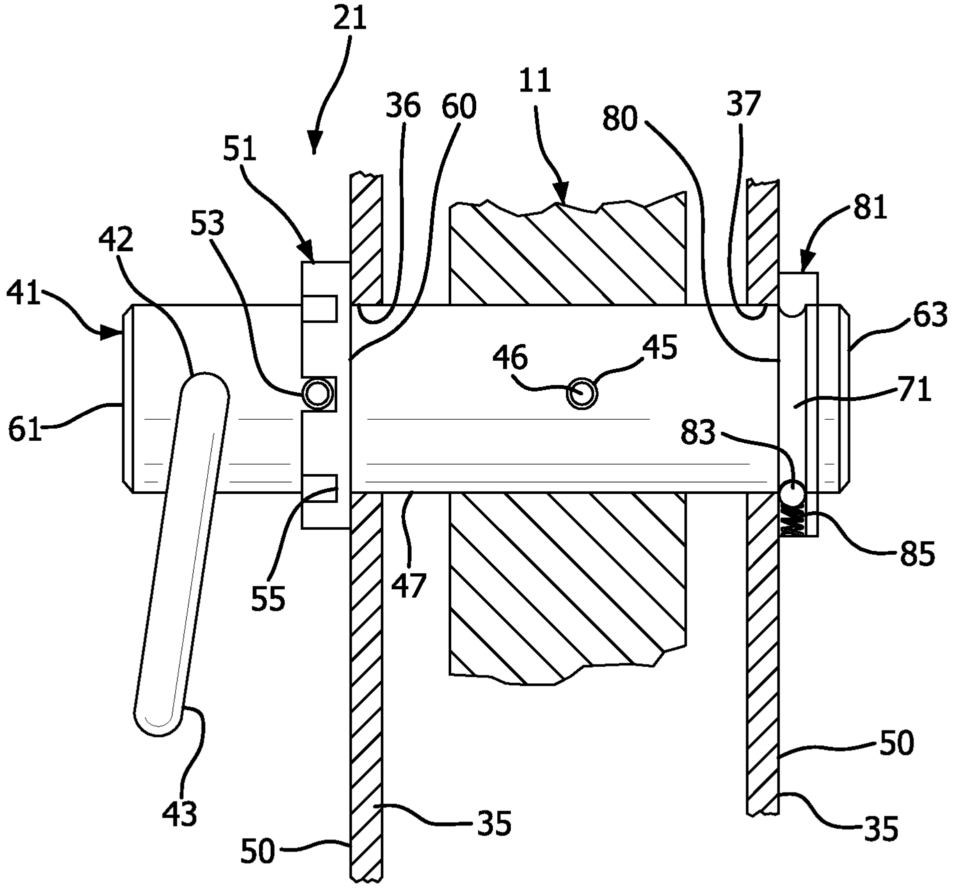
FIG. 8 is a partial top plan view in partial cross section of a base assembly according to another exemplary embodiment of the present invention in which a second locking ring further secures the pivot pin.
Figure 9:
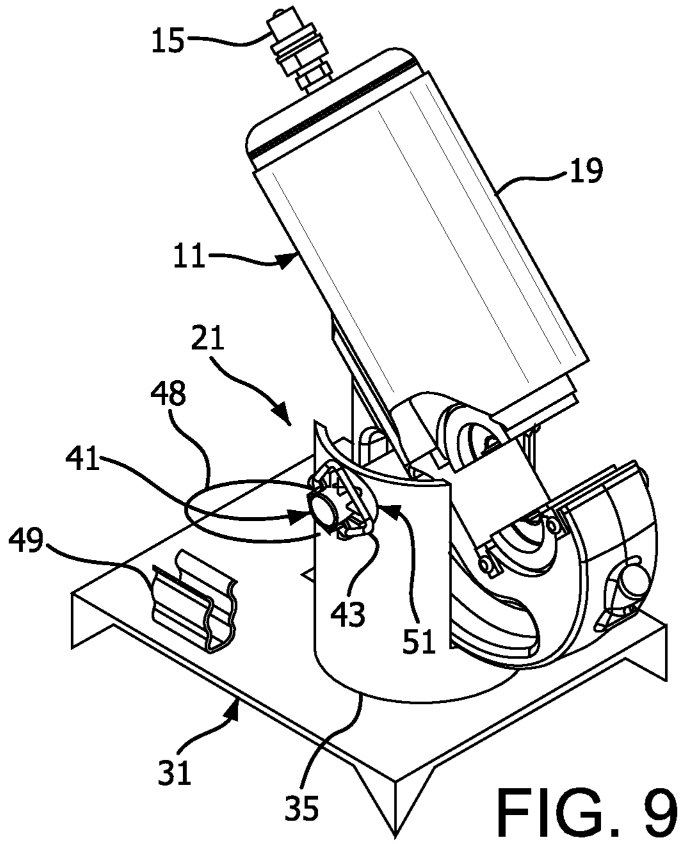
FIG. 9 is a perspective view of the multi-position base assembly of FIG. 8 receiving a tool in a first position.
Figure 10:
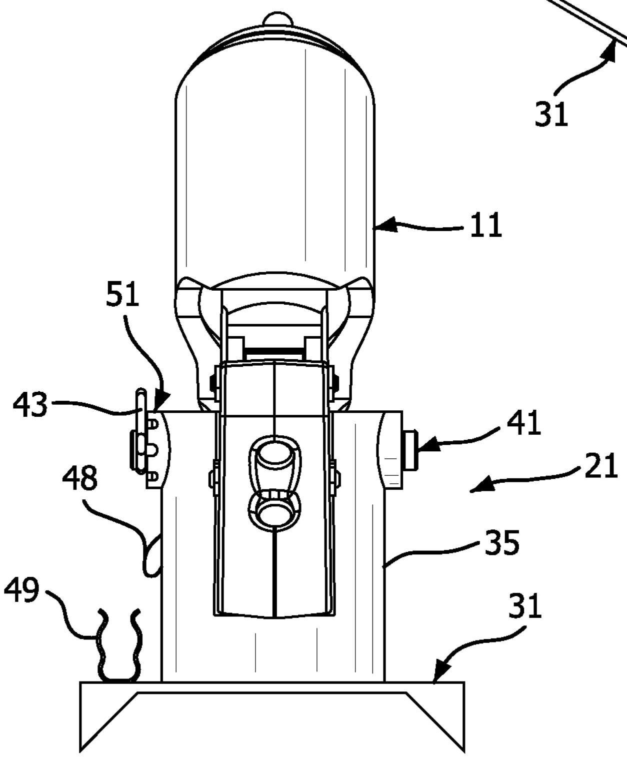
FIG. 10 is a rear elevational view of the base assembly and tool of FIG. 9.
Figure 11:
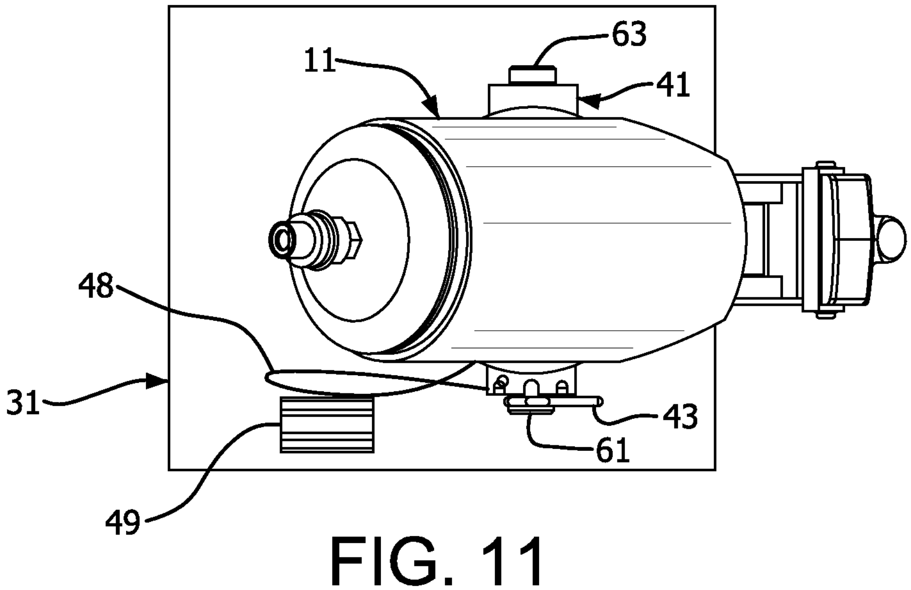
FIG. 11 is a top plan view of the base assembly and tool of FIG. 9.
Figure 12:
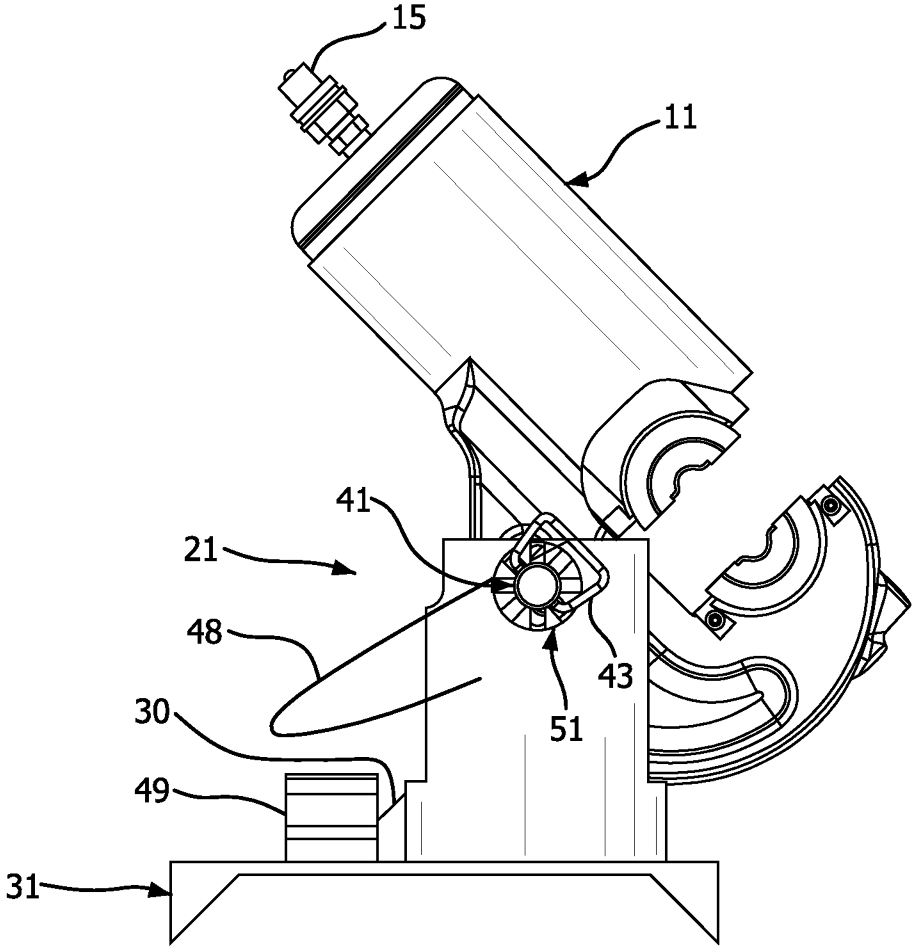
FIG. 12 is side elevational view of the base assembly and tool of FIG. 9.
Figure 13:
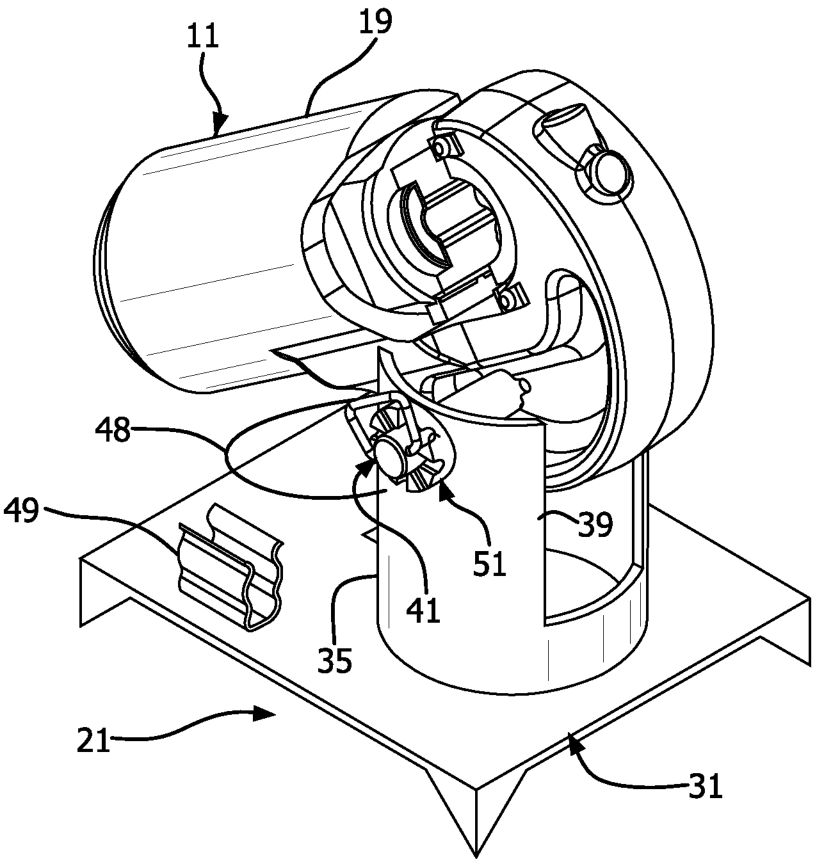
FIG. 13 is a perspective view of the multi-position base assembly of FIG. 8 receiving a tool in a second position.
Figure 14:
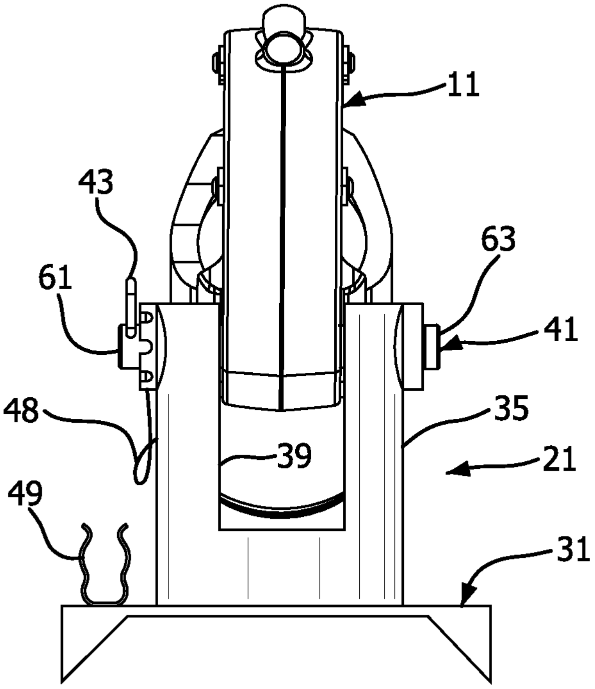
FIG. 14 is rear elevational view of the base assembly and tool of FIG. 13.
Figure 15:
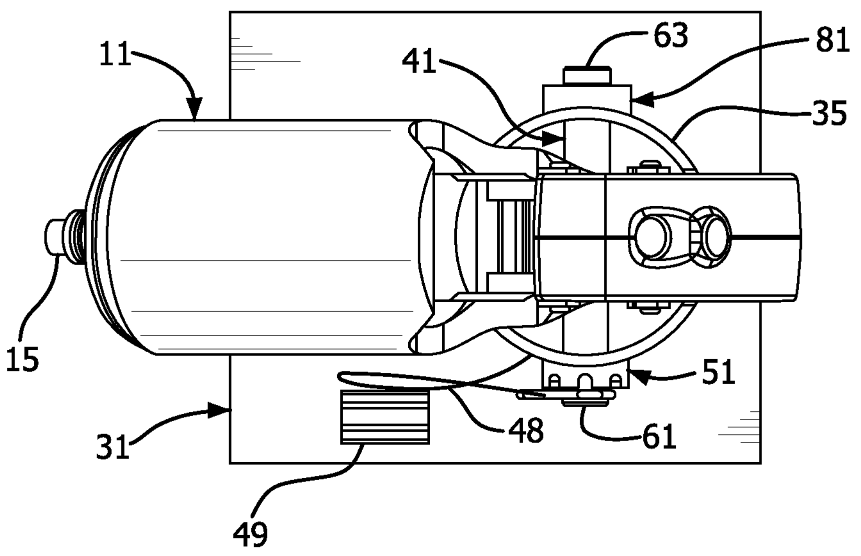
FIG. 15 is a top plan view of the base assembly and tool of FIG. 13.
Figure 16:
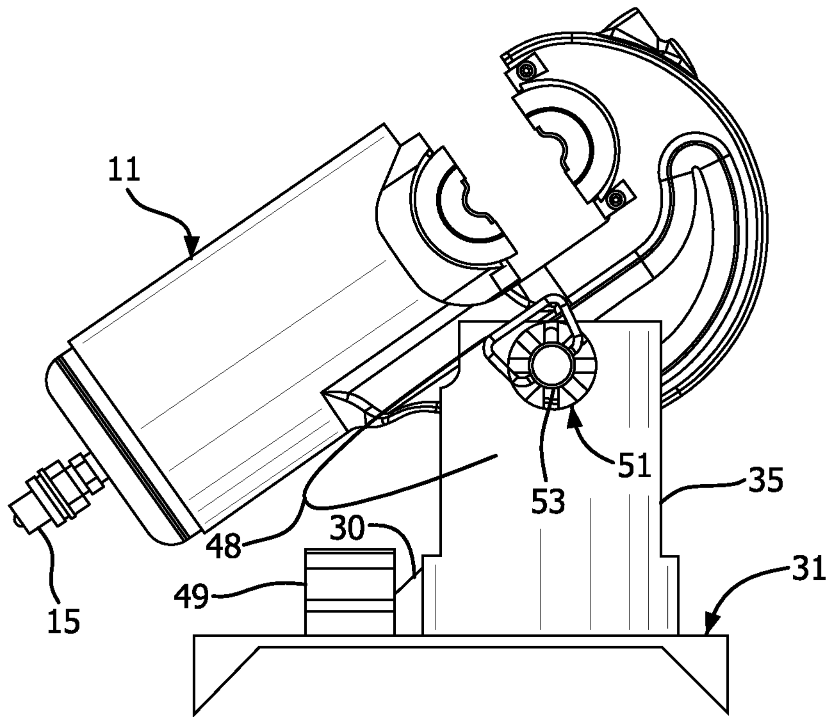
FIG. 16 is a side elevational view of the base assembly and tool of FIG. 13.
Figure 17:
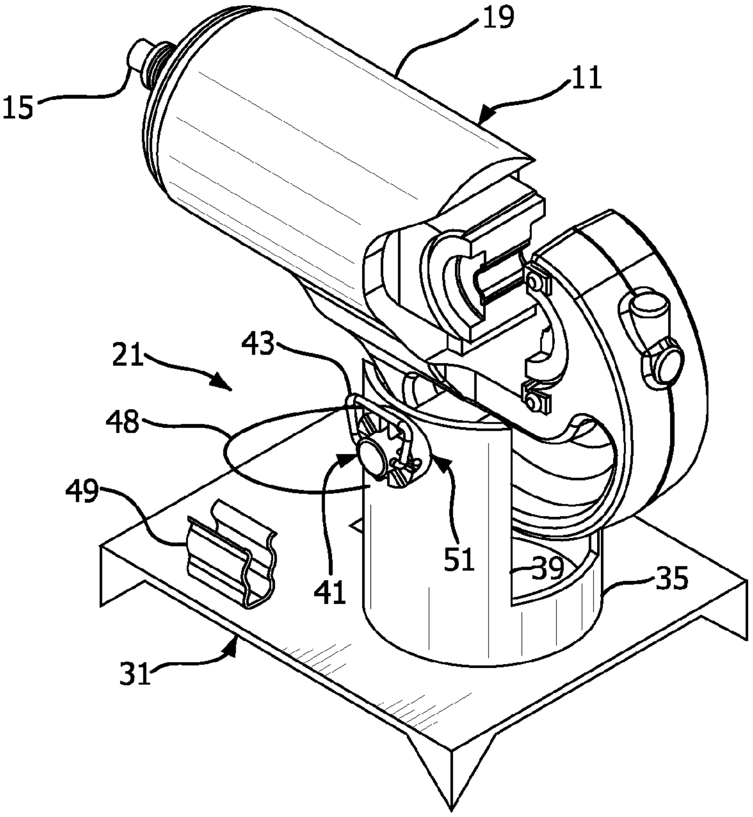
FIG. 17 is a perspective view of the multi-position base assembly of FIG. 8 receiving a tool in a third position.
Figure 18:
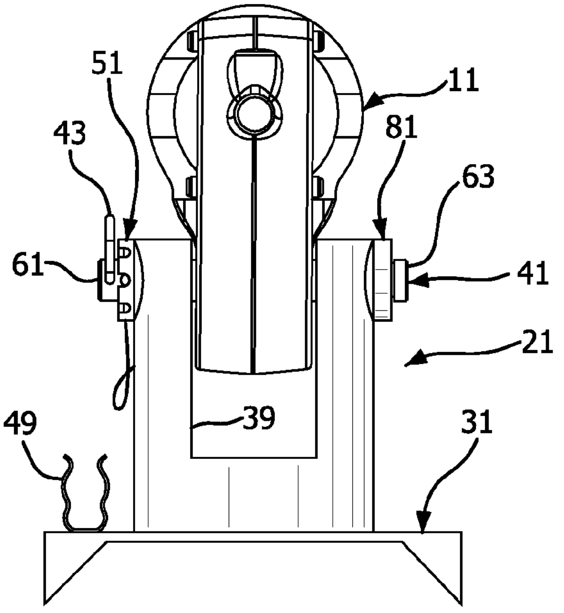
FIG. 18 is rear elevational view of the base assembly and tool of FIG. 17.
Figure 19:
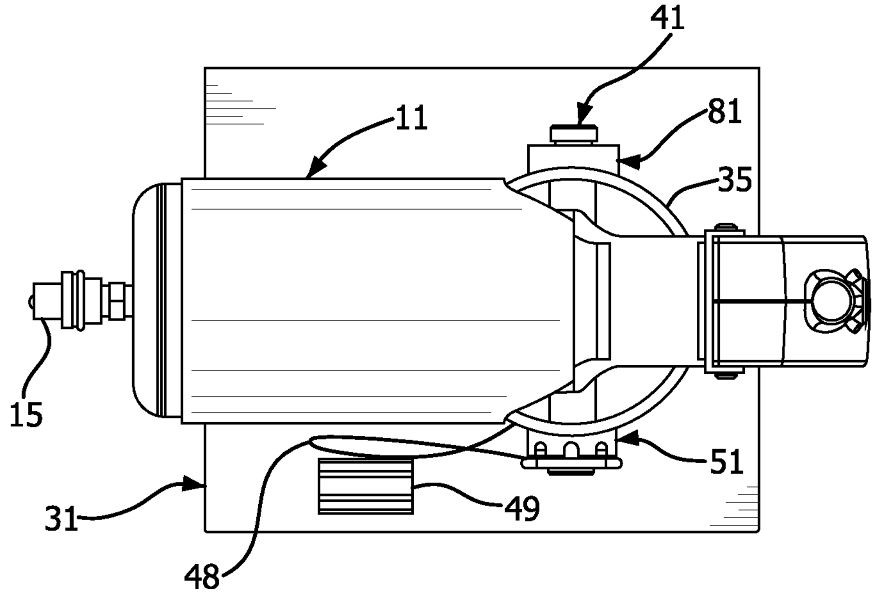
FIG. 19 is a top plan view of the base assembly and tool of FIG. 17.
Figure 20:
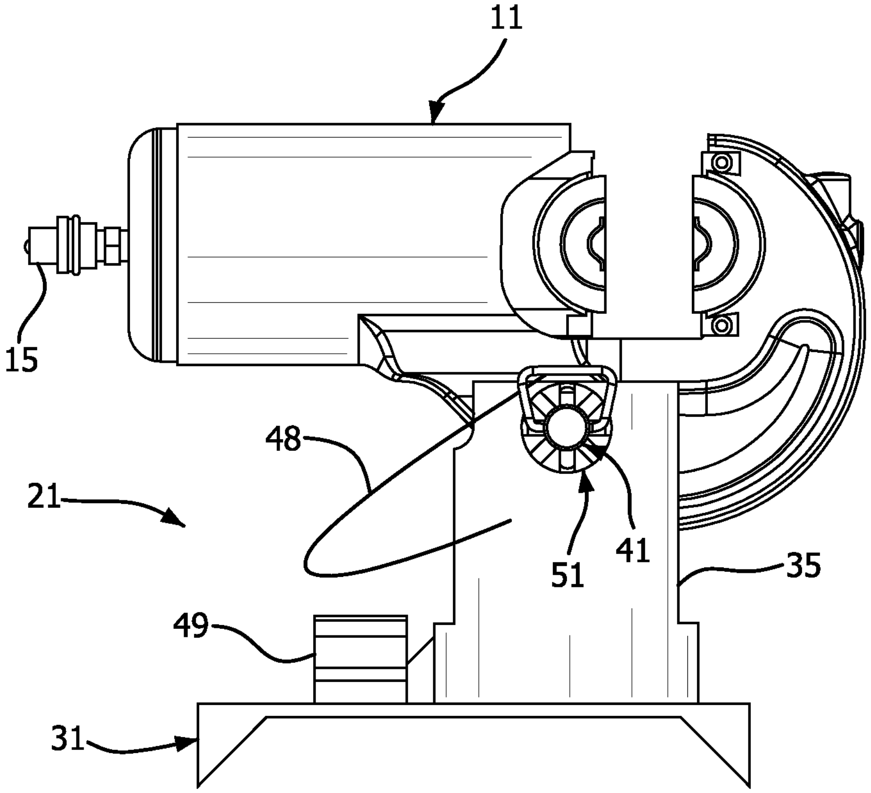
FIG. 20 is a side elevational view of the base assembly and tool of FIG. 17.
Figure 21:
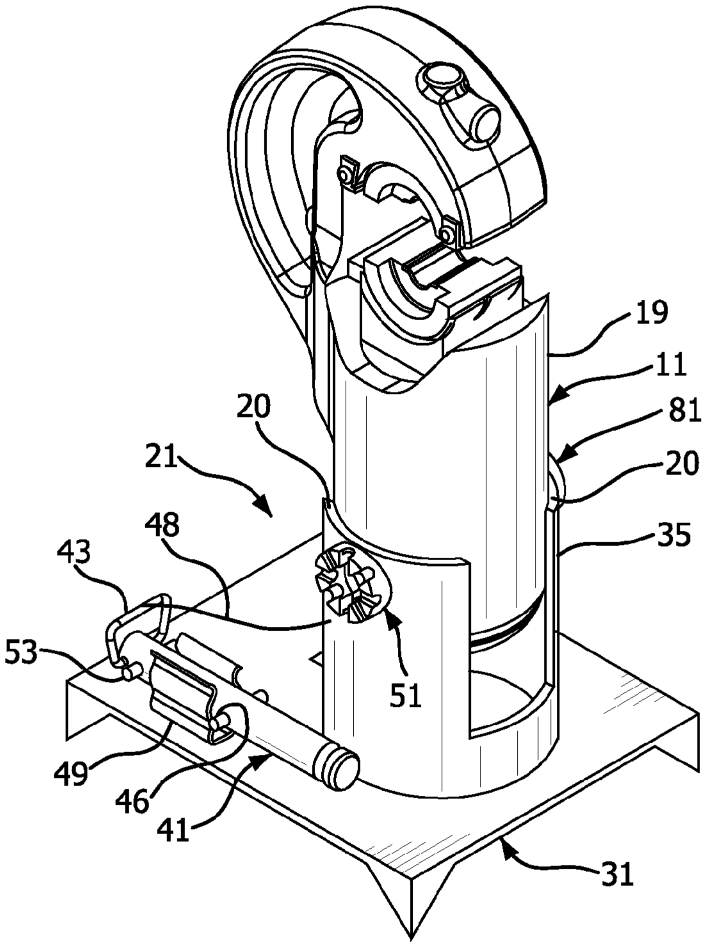
FIG. 21 is a perspective view of the multi-position base assembly of FIG. 8 receiving a tool in a fourth position.
Figure 22:
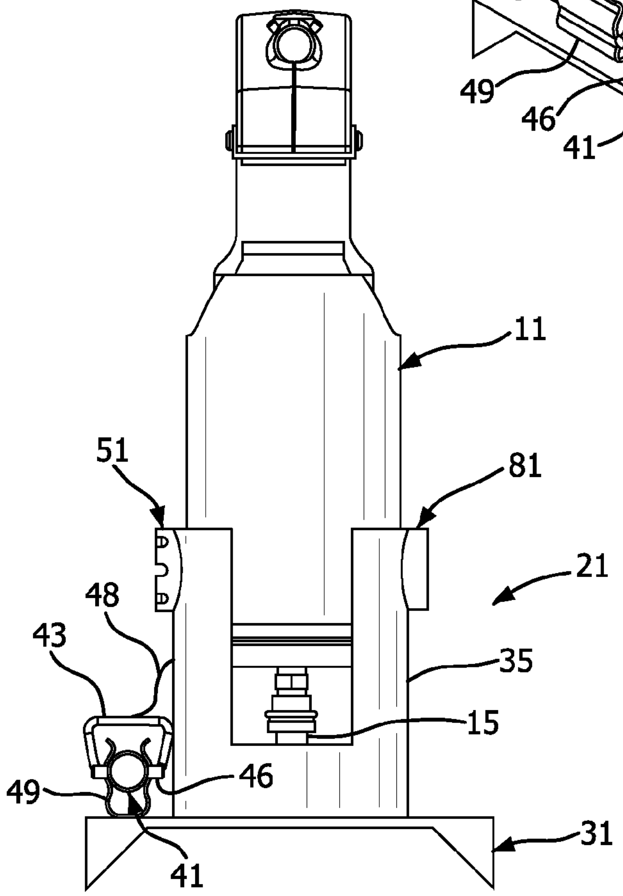
FIG. 22 is a rear elevational view of the base assembly and tool of FIG. 21.
Figure 23:
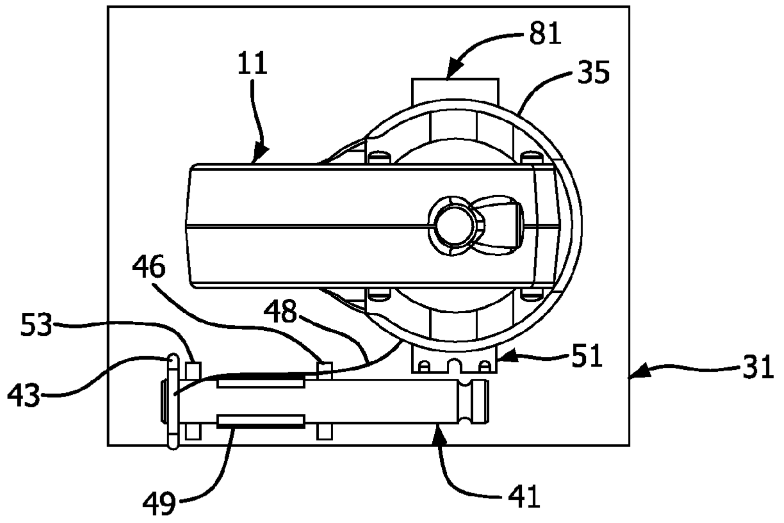
FIG. 23 is a top plan view of the base assembly and tool of FIG. 21.
Figure 24:
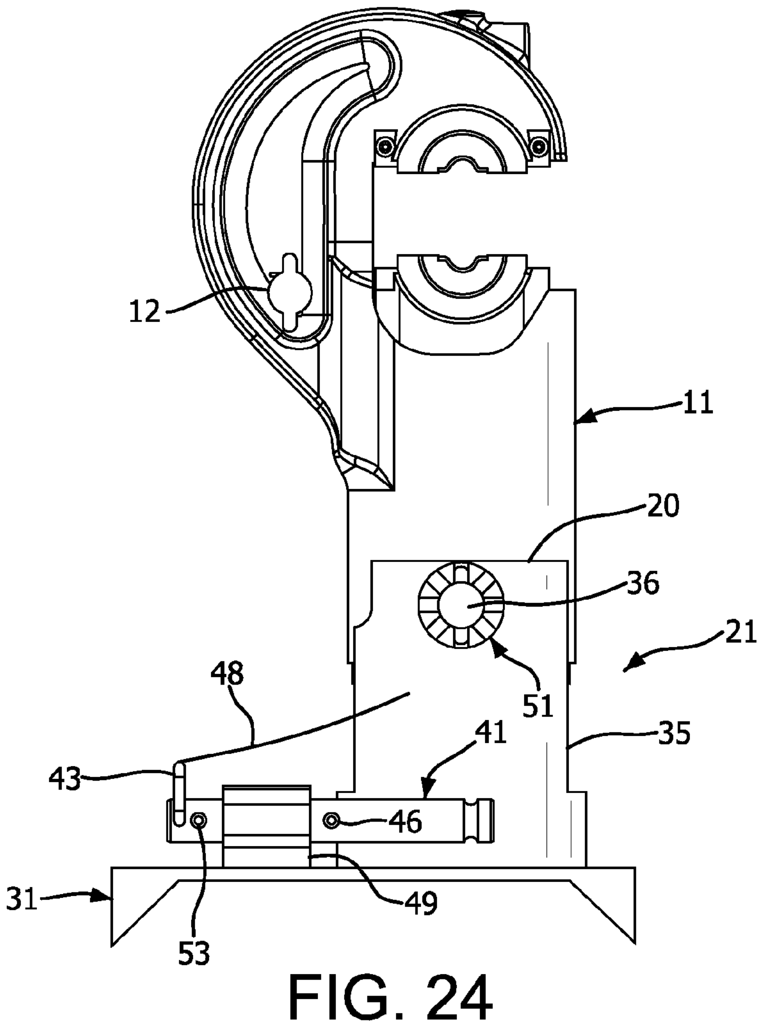
FIG. 24 is side elevational view of the base assembly and tool of FIG. 21.

The first locking ring 51 is disposed on an outer surface 47 of the pivot pin 41 and is secured to an outer surface 50 of the wall 35. The first locking ring 51 is preferably welded to the outer surface 50 of the wall 35, although any suitable means for connecting the first locking ring to the wall may be used. An inner surface 60 of the first locking ring 51 is shaped to conform to the shape of the wall 35. For example, when the wall 35 is substantially planar in the area of the first opening 36 then the inner surface 60 of the first locking ring 51 is substantially planar, and when the wall 35 is substantially cylindrical in the area of the first opening 36 then the inner surface 60 of the first locking ring 51 has a corresponding substantially cylindrical shape. The first locking ring 51 has a plurality of pairs of recesses 55 formed therein to receive the locking pin 53, as shown in FIGS. 1, 5 and 8. The two recesses of each pair are diametrically opposed to receive the locking pin 53 therein. When the locking pin 53 is disposed in a pair of recesses 55, the pivot pin 41 is substantially prevented from rotating. As shown in FIG. 6, the locking ring 51 has four pairs of recesses. However, any suitable number of recesses may be used. Additionally, the locking pin 53 substantially prevents axial movement of the pivot pin 41 to the right (as viewed in FIG. 5). The locking pin 53 is substantially perpendicular to a longitudinal axis of the pivot pin 41, as shown in FIGS. 5 and 6.

Figure 4:
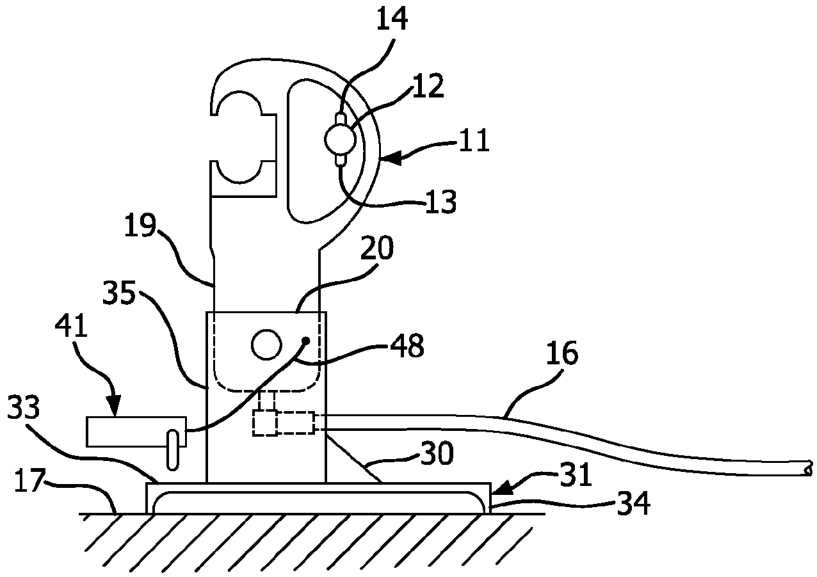
FIG. 4 is a side elevational view of the base assembly of FIG. 1 with a tool received in a vertical position.
Figure 7:
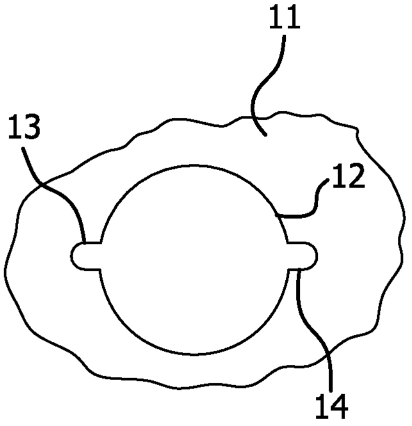
FIG. 7 is a side elevational view of the bore in the tool for receiving the pivot pin.

The pivot pin 41 is received by a through hole 12 in the tool 11, as shown in FIG. 5. The tool through hole 12, as shown in FIGS. 4 and 7, is substantially circular with first and second ears 13 and 14 adapted to receive the dowel pin 46. The tool through hole 12 aligns the tool 11 on the pivot pin 41 and prevents rotation of the tool 11 with respect to the pivot pin. When the locking pin 53 is removed from the first locking ring 51, the tool 11 rotates with rotation of the pivot pin 41, as indicated by the arrow in FIG. 2. When the desired position of the tool 11 is obtained, the locking pin 53 is inserted through the second through hole 44 in the pivot pin 41 and pressed into the corresponding recesses 55 (FIGS. 5 and 6) of the first locking ring 51 to lock the tool 11 in place.

Figure 3:
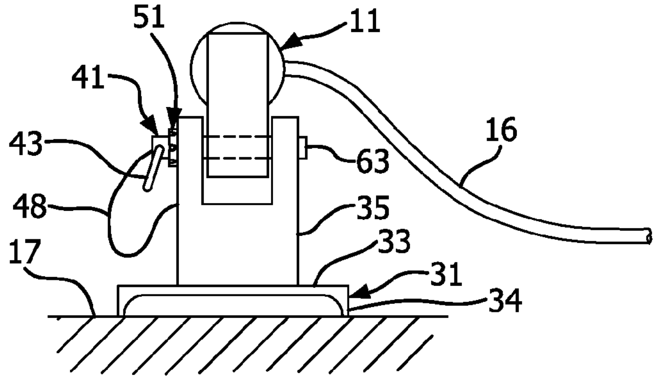
FIG. 3 is a front elevational view of the base assembly of FIG. 2 with the tool installed in a position rotated 180 degrees about a longitudinal axis of a pivot pin.

The tool 11, as shown in FIGS. 2-4, may be a hydraulic tool having a hydraulic connector 15 adapted to receive a hydraulic line 16 to power the tool 11. A step 18 is preferably formed on the cylinder 19 of the tool 11 to facilitate the tool being received by an upper surface of the wall 35 when the tool is mounted in the vertical position, as shown in FIGS. 4 and 21-24. The step 18 may be a plurality of diametrically opposed tabs, circumferential or any shape that facilitates being received by the upper surface 20 of the wall 35. A friction fit is formed between the inner surface of the wall 35 and the portion of the tool 11 received within the wall 35. The weight of the tool 11 prevents movement of the tool when mounted vertically such that the pivot pin 41 is not required.

In an alternative embodiment shown in FIG. 8, the pivot pin 41 has a groove 71 formed in the outer surface 47 thereof adjacent opening 37. The groove 71 extends around an entire circumference of the pivot pin 41 and is disposed outside of the wall 35. A second locking ring 81 is disposed on the outer surface 47 of the pivot pin 41 and abuts the outer surface 50 of the wall 35. A ball 83 is biased into the groove 71 by a spring 85 of the second locking ring 81. When the ball 83 is received in the groove 71 of the pivot pin 41, axial movement of the pivot pin to the left (as viewed in FIG. 8) is substantially prevented, thereby releasably restricting the pivot pin from being pulled through the second opening 37 in the wall 35. A pulling force exerted by the user on the pivot pin 41 causes the ball 83 to compress the spring 85 such that the second end 63 of the pivot pin may be pulled through the second opening 37 in the wall 35.

The second locking ring 81 is preferably welded to the outer surface 50 of the wall 35, although any suitable means for connecting the second locking ring to the wall may be used. An inner surface 80 of the second locking ring 81 is shaped to conform to the shape of the wall 35. For example, when the wall 35 is substantially planar in the area of the second opening 37 then the inner surface 80 of the second locking ring 81 is substantially planar, and when the wall 35 is substantially cylindrical in the area of the second opening 37 then the inner surface 80 of the second locking ring 81 has a corresponding substantially cylindrical shape.

Assembly and Operation

The base assembly 21 according to exemplary embodiments of the present invention is used with a tool 11, such as a 60 ton c-head crimping tool, as shown in FIGS. 9-24. The base assembly 21 may use a tether 48, a clip 49 or both during transportation to secure the pivot pin 41 to the base assembly 21 to prevent loss of the pivot pin. The legs 34 of the platform 33 are disposed on a work surface 17 to provide a stable environment for the base assembly 21.

The tool 11 is disposed within the wall 35 such that the tool through hole 12 is aligned with the first and second openings 36 and 37 in the wall 35, as shown in FIG. 5. The first and second cutouts 38 and 39 in the wall allow the tool 11 to be received therein and allow for rotation of the tool. The tool 11 through hole 12 receives the pivot pin 41 and the dowel pin 46, thereby securing the tool to the pivot pin and preventing rotation of the tool with respect to the pivot pin. The ears 13 and 14 of the tool through hole 12 receive the dowel pin 46. The second end 63 of the pivot pin 41 passes through the second opening 37 in the wall 35, thereby supporting the tool 11 on the base assembly 21. The tool 11 is now rotatable with respect to the wall 35 of the base assembly 21, as shown in FIG. 2.

When the desired position of the tool 11 is obtained, the locking pin 53 is inserted through the second through hole 44 in the pivot pin 41 and pressed into the corresponding pair of recesses 55 in the first locking ring 51, as shown in FIGS. 1 and 5. With the locking pin 53 pressed into the pair of recesses 55 in the first locking ring 51, the pivot pin 41 is substantially prevented from rotating. The locking pin 53 is removed from the pair of recesses 55 and from the second through hole 44 to rotate the pivot pin 41, thereby rotating the tool 11 between various positions, as shown in FIGS. 9-20. FIGS. 9-12 correspond to the locking pin 53 being in a first pair of recesses in the first locking ring 51. FIGS. 13-16 correspond to the locking pin 53 being in a second pair of recesses in the first locking ring 51. FIGS. 17-20 correspond to the locking pin 53 being in a third pair of recesses in the first locking ring 51.

In another exemplary embodiment, as shown in FIG. 8, a second locking ring 81 is connected to the outer surface 50 of the wall adjacent the second opening 37 such that the second end 63 of the pivot pin 41 passes through the second locking ring 81. The spring 85 of the second locking ring 81 biases the ball 83 toward the outer surface 47 of the pivot pin 41. The ball 83 is received by the groove 71 in the pivot pin 41 and the ball is retained in the groove 71 by the elastic force of the spring 85. Accordingly, the second locking ring 81 prevents the pivot pin from moving axially to the left as viewed in FIG. 8. The ball 83 is free to move in the groove 71 such that rotation of the pivot pin 41 is not prevented when locking pin 53 is removed.

FIGS. 21-24 correspond to the tool 11 being mounted in a vertical position. A step 18 is preferably formed on the tool 11 and is received by the upper surface 20 of the wall 35. The weight of the tool 11 prevents movement of the tool when mounted vertically. Additionally, a friction fit is formed between the inner surface of the wall 35 and the portion of the tool 11 received within the wall 35. Accordingly, the pivot pin 41 is not required when the tool 11 is mounted vertically such that the pivot pin may be disposed in the clip 49 to prevent loss thereof.

The foregoing embodiments and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims.

What is claimed is:

1. A method of adjustably positioning a tool on a base assembly, comprising the steps of aligning a first through hole in the tool with first and second openings in a fixed wall extending upwardly from a base of the base assembly;

passing a pivot pin through the first opening, the first through hole and the second opening;

rotationally fixing the pivot pin to the tool;

rotating the pivot pin to position the tool about a longitudinal axis of the pivot pin;

releasably passing a locking pin through a first through hole in the pivot pin to prevent further rotation of the pivot pin; and engaging the locking pin with a first recess formed in a first locking ring fixed on the wall and disposed about the pivot pin to lock the tool in a first position.

2. The method of positioning a tool on a base assembly of claim 1, further comprising disposing a second locking ring on the pivot pin to prevent accidental axial movement of the pivot pin.

3. The method of positioning a tool on a base assembly of claim 2, wherein the first and second locking rings are disposed on opposite sides of the tool.

4. The method of positioning a tool on a base assembly of claim 1, further comprising preventing rotation of the tool with respect to the pivot pin when the tool receives the pivot pin.

5. The method of positioning a tool on a base assembly of claim 1, further comprising tethering the pivot pin to a base to prevent loss of the pivot pin when the pivot pin is removed from the tool.

6. The method of positioning a tool on a base assembly of claim 1, further comprising removing the locking pin from the first recess to rotate the tool to a second position.

7. The method of positioning a tool on a base assembly of claim 6, further comprising engaging the locking pin with a second recess formed in the first locking ring to lock the tool in the second position.

8. The method of positioning a tool on a base assembly of claim 6, further comprising rotating the pivot pin to rotate the tool to the second position.

9. The method of positioning a tool on a base assembly of claim 1, further comprising passing the locking pin through the longitudinal axis of the pivot pin.

10. The method of positioning a tool on a base assembly of claim 1, further comprising engaging the locking pin substantially perpendicular to the longitudinal axis.

11. A method of adjustably positioning a tool on a base assembly, comprising the steps of aligning a first through hole in the tool with first and second openings in a fixed wall extending upwardly from a base of the base assembly;

passing a pivot pin through the first opening, the first through hole and the second opening;

rotationally fixing the pivot pin to the tool;

rotating the pivot pin to position the tool;

releasably passing a locking pin through a first through hole in the pivot pin to prevent further rotation of the pivot pin;

tethering the pivot pin to a base to prevent loss of the pivot pin when the pivot pin is removed from the tool.

12. The method of positioning a tool on a base assembly of claim 11, further comprising passing the locking pin through a longitudinal axis of the pivot pin.

13. The method of positioning a tool on a base assembly of claim 11, further comprising engaging the locking pin substantially perpendicular to a longitudinal axis of the pivot pin.

* * * * *